(12) United States Patent
Kuc et al.

(10) Patent No.: US 9,191,233 B2
(45) Date of Patent: Nov. 17, 2015

(54) MESSAGE TRANSMISSION IN NETWORKS (71) Applicant: Avaya Inc., Basking Ridge, NJ (US)

(72) Inventors: Zenon Kuc, San Jose, CA (US); Roger Lapuh, Uesslingen (CH); Karthik Gopalakrishnan, San Jose, CA (US); Paul Unbehagen, Fairplay, CO (US); John Mead, Fremont, CA (US); Greg Landry, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/041,173

(22) Filed: Sep. 30, 2013

(65) Prior Publication Data

US 2015/0095449 A1    Apr. 2, 2015

(51) Int. Cl.
*H04L 12/28* (2006.01)
*H04L 12/26* (2006.01)
*H04L 12/46* (2006.01)
*H04L 12/24* (2006.01)
*H04L 12/721* (2013.01)

(52) U.S. Cl.
CPC .............. *H04L 12/46* (2013.01); *H04L 41/12* (2013.01); *H04L 45/12* (2013.01)

(58) Field of Classification Search
CPC ...... H04L 45/122; H04L 47/125; H04L 45/74
USPC ..................... 709/217/218/219/220
See application file for complete search history.

(56) References Cited

U.S. PATENT DOCUMENTS

| | | | | |
|---|---|---|---|---|
| 7,545,754 | B2 * | 6/2009 | Funato et al. | 370/254 |
| 8,416,789 | B1 | 4/2013 | Busch | |
| 2011/0007667 | A1 | 1/2011 | Takacs | |
| 2012/0106347 | A1 * | 5/2012 | Allan et al. | 370/238 |
| 2013/0294451 | A1 * | 11/2013 | Li et al. | 370/392 |

OTHER PUBLICATIONS

"Link Layer Discovery Protocol and MIB"—Paul Congdon, IEEE, Mar. 2002 http://www.ieee802.org/1/files/public/docs2002/lldp-protocol-00.pdf.*
International Patent Office; Patents Directorate, South Wales, Search Report mailed Jun. 20, 2014 cited in corresponding GB1322639.4; 3 pages.
International Patent Office; Patents Directorate, South Wales, Search Report mailed Jun. 20, 2014 cited in corresponding GB1322638.6; 3 pages.
International Patent Office; Patents Directorate, South Wales, Search Report mailed Jun. 23, 2014 cited in corresponding GB1322635.2; 3 pages.

* cited by examiner

*Primary Examiner* — Randy Scott
(74) *Attorney, Agent, or Firm* — IP Spring (57) ABSTRACT

Embodiments generally relate to message transmission in networks. In one embodiment, a method includes enabling a user to provide shortest path bridging (SPB) configuration information. The method also includes receiving the SPB configuration information from the user. The method also includes sending the SPB configuration information to an edge server device.

20 Claims, 8 Drawing Sheets

| E | VLAN/ISID bindings | |
|---|---|---|
| | pending | approved |
| local | | |
| remote | | |

| $N_1$ | VLAN/ISID bindings | |
|---|---|---|
| | pending | approved |
| local | | |
| remote | | |

FIG. 6

| E | VLAN/ISID bindings | |
|---|---|---|
| | pending | approved |
| local | | |
| remote | | |

| $N_1$ | VLAN/ISID bindings | |
|---|---|---|
| | pending | approved |
| local | 6/600 | |
| remote | | |

FIG. 7

| E | VLAN/ISID bindings | |
|---|---|---|
| | pending | approved |
| local | | |
| remote | 6/600 (N1) | |

| $N_1$ | VLAN/ISID bindings | |
|---|---|---|
| | pending | approved |
| local | 6/600 | |
| remote | | |

FIG. 8

| E | VLAN/ISID bindings | |
|---|---|---|
| | pending | approved |
| local | | |
| remote | | 6/600 (N1) |

| $N_1$ | VLAN/ISID bindings | |
|---|---|---|
| | pending | approved |
| local | 6/600 | |
| remote | | |

FIG. 9

| E | VLAN/ISID bindings | |
|---|---|---|
| | pending | approved |
| local | | |
| remote | | 6/600 (N1) |

| $N_1$ | VLAN/ISID bindings | |
|---|---|---|
| | pending | approved |
| local | | 6/600 |
| remote | | |

FIG. 10

| E | VLAN/ISID bindings | |
|---|---|---|
| | pending | approved |
| local | | |
| remote | | 6/600 (N1) |

| N₂ | VLAN/ISID bindings | |
|---|---|---|
| | pending | approved |
| local | 6/666 | |
| remote | | |

FIG. 11

| E | VLAN/ISID bindings | |
|---|---|---|
| | pending | approved |
| local | | |
| remote | 6/666 (N2) | 6/600 (N1) |

| N₂ | VLAN/ISID bindings | |
|---|---|---|
| | pending | approved |
| local | 6/666 | |
| remote | | |

FIG. 12

| E | VLAN/ISID bindings | |
|---|---|---|
| | pending | approved |
| local | | |
| remote | | 6/600 (N1) 6/666 (N2) |

| N₂ | VLAN/ISID bindings | |
|---|---|---|
| | pending | approved |
| local | 6/666 | |
| remote | | |

FIG. 13

| E | VLAN/ISID bindings | |
|---|---|---|
| | pending | approved |
| local | | |
| remote | | 6/600 (N1) 6/666 (N2) |

| N₂ | VLAN/ISID bindings | |
|---|---|---|
| | pending | approved |
| local | | 6/666 |
| remote | | |

MESSAGE TRANSMISSION IN NETWORKS

CROSS REFERENCE TO RELATED APPLICATIONS

The following commonly owned, co-pending United States patent applications, including the present application, are related to each other. Each of the other patents/applications are incorporated by reference herein in its entirety:

U.S. patent application Ser. No. 14/041,342, entitled "ENABLING CONFIGURATION IN NETWORKS," filed Sep. 30, 2013; and U.S. patent application Ser. No. 14/041,242, entitled "ENABLING ENCAPSULATION IN NETWORKS," filed Sep. 30, 2013.

BACKGROUND

Communication networks are widely used to provide communication between different computer systems and other electronic devices. Wireless communication networks offer increased convenient access to client devices, such as computers, phones, and other devices, by allowing network communications between these devices without the need for wired connections. Conventionally, a single device performs all mapping and encapsulation functions in a network system such as in a virtual local area network (VLAN). The configuration process for the device for mapping and encapsulation is extensive and typically requires much time and expertise.

DETAILED DESCRIPTION

Implementations described herein facilitate configuration of a network by providing a simple, user-friendly, edge configuration device that obtains shortest path bridging (SPB) configuration information from a user rather than a more complex edge server obtaining the SPB configuration information.

In various implementations, a system enables transmission of messages between an edge configuration device and a separate edge server device. In some implementations, the messages are link layer discovery protocol (LLDP) messages, which contain SPB configuration information. In various implementations, an edge configuration device of the system enables a user to provide the SPB configuration information, and the edge configuration device receives the SPB configuration information from the user. The edge configuration device then sends the SPB configuration information to a separate edge server device. The SPB configuration information includes virtual local area network-to-service identification (VLAN-to-ISID) mapping information. As described in more detail below, the SPB configuration information enables provider backbone bridge (MAC-in-MAC) encapsulation at the edge server device. The SPB configuration information also enables intermediate system-to-intermediate system (IS-IS) configuration at the edge server device.

In various implementations, the system enables configuration in networks utilizing the edge configuration device, which provides SPB configuration information to the edge server device, where the message containing the SPB configuration information triggers the edge server device to perform IS-IS configuration. In some implementations, the edge server device receives a message from the edge configuration device, where the message contains SPB configuration information. In response to receiving the message, the edge server device performs an IS-IS configuration, and may perform an SPB configuration.

In various implementations, the system enables encapsulation in networks utilizing the edge configuration device, which provides SPB configuration information to the edge server device, where the message containing the SPB configuration information triggers the edge server device to perform MAC-in-MAC encapsulation. In some implementations, the edge server device receives a message from the edge configuration device, where the message contains SPB configuration information. In response to receiving the message, the edge server device performs MAC-in-MAC encapsulation. In various implementations, the SPB configuration information includes VLAN-to-ISID mapping information, which the edge server device uses for MAC-in-MAC encapsulation.

Figure 1:
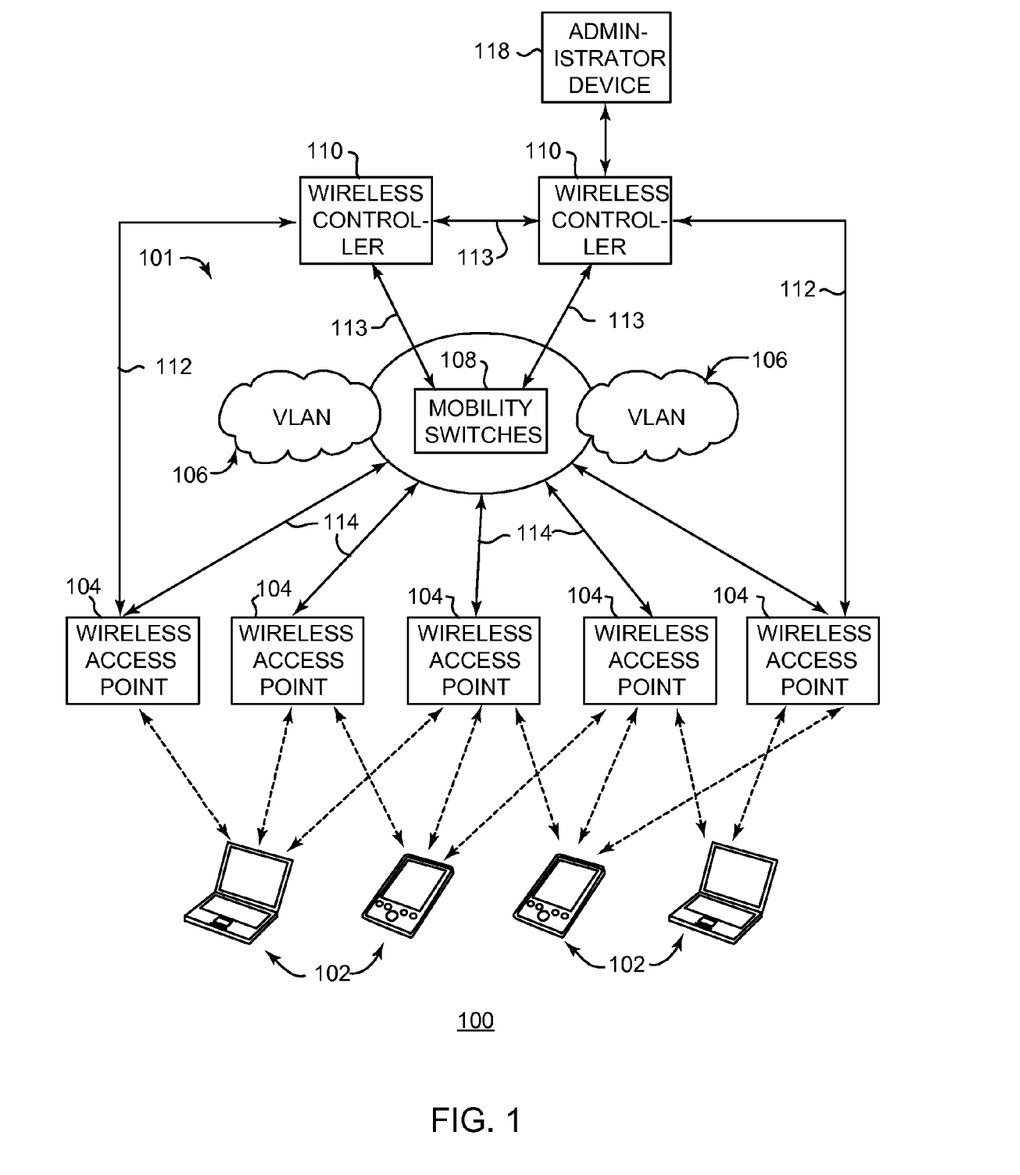
FIG. 1 illustrates a block diagram depicting an example network environment, which may be used to implement some implementations described herein.

FIG. 1 is a block diagram of an example network system 100 which can be used with some implementations described herein. The network system 100 may include a network 101 providing communication links between multiple devices connected to the network. Network 101 can include any type of network that connects devices, such as a wide area network (WAN), local area network (LAN), wireless network, or others types of networks. Any one or more networking standards can be used for network 101, such as Ethernet, common wireless networking standards, etc. In various implementations described herein, a wireless network is used for at least a portion of the network 101.

Client devices 102 can be operated by users and can communicate with other client devices 102 as well as other devices via the network 101. In various implementations, the client devices 102 can include wireless transmitters and receivers (e.g., transceivers, or radios) that allow them to communicate signals wirelessly with other devices that also have this capability. Each client device 102 can be any of a variety of types of devices. For example, in some implementations, client devices 102 can be implemented as desktop computers, laptop computers, tablet computers, portable devices, cell phones, media players, wearable devices (e.g., glasses device, wristwatch device, etc.), entertainment devices (television, disc player, stereo), mainframe computer, peripherals (printer, scanner, sensors), or other electronic devices.

Wireless access points 104 are devices that allow other wireless-capable devices to connect to a communication network and communicate with each other. The wireless access points 104 can transmit and receive wireless communication signals to and from other devices having compatible wireless communication functionality. In the example system 100, the wireless access points 104 can transmit wireless signals to the client devices 102 via one or more wireless protocols, and can receive wireless signals from client devices 102 via such protocols. Some examples of current suitable wireless protocols include those protocols defined under IEEE 802.11. Other protocols can also be used. Thus, the client devices can communicate all data traffic via wireless access points 104 in range of the clients' transmitters and receivers.

Wireless access points 104 are connected to other network devices provided in network 101. The access points 104 can be used to communicate data traffic to and from client devices 102 through the network. The wireless access points 104 can send data traffic from client devices 102 to other network devices to send the traffic to the desired network destination. They can also receive data traffic from other devices via the network devices to provide to the client devices 102. Any of a variety of different wireless network topologies, devices, and functions can be used. For example, in some implementations, multiple virtual local area networks (VLANs) 106 can be provided, which provide partitions for client devices connected to the network 101 into distinct domains that are isolated from each other. Some implementations can provide communication between VLANs using mobility switches 108. For example, the wireless access points 104 can be connected (e.g., via wired connection such as Ethernet) to mobility switches 108, which can implement mobility tunnels. Such mobility tunnels allow client devices 102 to communicate via particular VLANs 106 associated with particular wireless access points 104 with which the client devices 102 are communicating. Various implementations can include different kinds of switches, hubs, routers, and other types of network devices in the network 101.

One or more wireless access controllers 110, referred to herein also as controllers or wireless controllers, can be included in system 100. Controllers 110 are devices used to manage, control and/or configure wireless access points 104, mobility switches 108, VLANs 106, and/or other network devices or structures connected to the network 101. In some implementations, multiple controllers 110 can be used as shown, where each controller 110 can be associated with a different VLAN 106 and/or set of wireless access points 104. In some examples, if a client device 102 communicates with a wireless access point 104 that is associated with a first controller 110, and the client device then "roams" to communicate with a different wireless access point 104 associated with a second controller 110, the first controller 110 can provide the necessary information to the second controller 110 to maintain the client connection.

In some described implementations, the wireless controllers 110 can configure the wireless access points 104 with changed or new functionality. For example, the controllers 110 can send (or cause to be sent) a firmware image or other software image or code as an upgrade to one or more selected wireless access points 104. Controllers 110 can also select or apply particular settings or functions on wireless access points 104 or other devices connected to the network. Controllers 110 also receive information from connected devices including wireless access points 104, such as status information regarding the settings and status of various functions of the wireless access points 104 (e.g., data communication, transmission, reception, readiness, etc.). In some implementations, communication between the controllers 110 and the wireless access points 104 can be provided on dedicated control connections 112 (which can connect appropriate controllers 110 to all the wireless access points 104), where the dedicated control connections 112 can be separate from the connections 114 used to transmit client data traffic between the wireless access points 104 and VLANs 106. In other implementations, the wireless controllers 110 can communicate with the wireless access points 104 via connections 114 instead of or in addition to communication over dedicated control connections 112. Controllers 110 can also communicate control information with mobility switches 108 and with each other via other control connections 113.

In some example implementations, an initializing wireless access point 104 discovers a wireless controller 110 using a discovery protocol and establishes a control channel with the controller 110 (e.g., associates with one of the controllers). During its operation, the access point 104 reports monitoring information to the associated controller 110. A wireless access point 104 may also (e.g., periodically) scan the air and report any neighboring access points to its associated controller 110. For example, the access point can collect the operating channel and receiver power information of each neighboring access point it detects and can send it to its controller 110.

The configuration for the wireless access point 104 is defined on the controller 110 and can be sent to the wireless access 104 point after the wireless access point 104 associates with controller 110 over the control channel. For example, access point profiles stored by the controller 110 can be used to define the access point configuration for different access points. The wireless access point 104 is configured according to the received configuration from the controller, 110 such as a set of configuration instructions.

In various example implementations, the configuration can include a software upgrade as described above. The upgrade image can be stored on storage local to the associated controller 110 or can be stored on one or more separate servers in communication with the wireless access point 104 to be configured. For example, a wireless access point 104 can download a software image from a server using a standard protocol such as HTTP or TFTP. The upgrade image can be controlled and triggered by a wireless controller 110, such that the controller sends a request to the wireless access point 104 to download and install the software image. For example, the wireless access point 104 can save the received software image in a non-volatile memory partition. After the wireless access point 104 has downloaded the image, it restarts (e.g., reboots) to initialize and operate with the new image. In some implementations, the restart can be triggered by another command from the controller which allows decoupling of the download activity from the restart activity of the access point.

For example, a restart can be triggered after all of the access points targeted for the upgrade have indicated that they have successfully downloaded the software image. After restart, the access point can go through the discovery procedure to find and establish a connection with a wireless controller 110. At that point, the wireless access point 104 is ready to service client data traffic. In some other types of configuration, the wireless access point 104 can receive new parameters, such as new radio parameters, from a controller 110 or from another device connected to the network. Applying some of these parameters may also require the access point to restart and re-associate with a wireless controller.

During the time of restarting, and during the time of management by the controller 110 (e.g., the time to discover a controller, associate with a controller, and establish a connection with the controller), the access point typically cannot accept or maintain client connections or route client data traffic. Thus, the wireless communication provided by the access point is typically disabled during much of its configuration, causing downtime for its wireless service. For example, in configurations involving a new software image, some implementations of access point may disconnect client devices 102 during download of the image and during restarting of the wireless access point 104 to run the new image. In other implementations, a wireless access point 104 can download and save software images in local storage while client devices 102 are actively connected, but after the decision to boot the access point into a new image is triggered, the access point loses all of its client connections until it restarts with the newly active image. Other types of configurations may also cause downtime. For example, in some implementations, if radio parameters are modified during operation or existing networks are deleted, a disassociation of currently active clients can be triggered (e.g., bringing down and bringing up of radios) on the associated radio or network.

An administrator device 118 connects to one or more of the wireless controllers 110 to communicate with the controller. For example, the administrator device 118 can receive status information regarding the controller 110 and/or the network 101. The administrator device 118 can also manage the network 101 by sending commands and data to various network devices such as the controllers 110 to configure the controller and/or configure other devices connected to the network 101 via the controller 110. An administrator or other user operating the administrator device 118, for example, can send a command to cause a configuration of designated access points as described above. The administrator device 118 can be connected to the network 101 via any type of network connection. For example, in some implementations, a wireless management service can use a web-based front end to provide a user access to the network.

A software application stored in a memory or computer-readable storage medium provides instructions that enable a processor to perform these functions and other functions described herein.

Although embodiments described herein are described in the context of one or two edge configuration devices and one edge server device, one of ordinary skill in the art will readily recognize that there could be any number of edge configuration devices and edge server devices.

Figure 2:
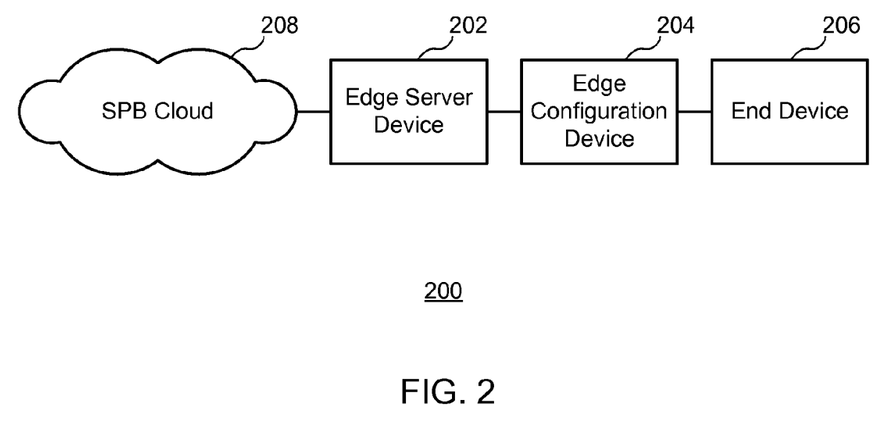
FIG. 2 illustrates a block diagram depicting an example edge configuration device and edge server device, which may be used to implement some implementations described herein.

FIG. 2 illustrates a block diagram depicting an example system 200 that includes an edge server device 202 and edge configuration device 204, which may be used to implement some implementations described herein. In various implementations, edge configuration device 204 couples to an end device 206, which may also be referred to as a client device. Also, edge server device 202 couples to an SPB cloud 208. SPB, which is specified in the IEEE 802.1aq standard, is a computer networking technology that simplifies the creation and configuration of networks, while enabling multipath routing. As shown in FIG. 2, edge configuration device 204 and edge server device 202 are separate devices.

In various implementations, each of the edge server device 202 and the edge configuration device 204 has a command-line interface (CLI), also referred to as a command-line user interface. A CLI enables a user to interact with a computer program where the user/customer/client issues commands to a program in the form of successive lines of text (command lines).

In some implementations, edge server device 202 may also be referred to as a fabric attach server (FA server). In various implementations, edge server device 202 performs MAC-in-MAC encapsulation functions, among other functions such as adding ISID fields to packets during MAC-in-MAC encapsulation, performing MAC-in-MAC decapsulation, etc.

In some implementations, edge configuration device 204 may also be referred to as a fabric attach host (FA host). In various implementations, edge configuration device 204 enables the user to configure SPB, after which edge configuration device 204 sends the resulting SPB configuration information to edge server device 202.

As described in more detail below, in various implementations, edge configuration device 204 adds a VLAN tag to a packet, and edge server device 202 uses that VLAN tag to perform the expected MAC-in-MAC encapsulation.

End device 206 and other end devices couple to edge configuration device 204's access ports. Possible end devices may include wireless access points, mobile devices such as smart phones, cameras, etc.

For ease of illustration, some implementations are described herein in the context of one edge server device, one edge configuration device, and one end device. These implementations and others also apply to multiple edge server devices, multiple edge configuration devices, and multiple end devices. Example implementations involving one edge server device and multiple edge configuration devices are described in more detail below.

Implementations described herein enable edge server device 202 to exchange information not only with other edge server devices but also with one or more edge configuration devices. In some implementations, edge server device 202 advertises its VLAN/ISID bindings per edge configuration device. As such, edge server device 202 may send a different LLDP message to each edge configuration device. In some implementations, edge server device 202 may operate in customer VLAN (CVLAN) user network interface mode and switched UNI mode simultaneously.

In various implementations, an edge configuration device connects to an edge server device or to an edge server device/edge server device' pair. In some implementations, there is no daisy-chaining of edge configuration devices.

Boot Up of an Edge Configuration Device

As indicated above, in various implementations, each edge server device and each edge configuration device broadcasts its device type. In some implementations, each edge server device and each edge configuration device also broadcasts its functional capabilities. In some implementations, each edge server device and each edge configuration device broadcasts its device type and functional capabilities in an LDDP message. For example, in some implementations, when the edge configuration device and the edge server device are powered up, and when LLDP is enabled in both the edge configuration device and the edge server device, the edge configuration device broadcasts that it is an edge configuration device (e.g., "I am an edge configuration device.") within its LLDP message, and the edge configuration device transmits its edge configuration capability out all its ports. Also, the edge server device broadcasts that is an edge server device (e.g., "I am an edge server device.") within its LLDP message. Based on this LLDP message exchange, the edge configuration device knows which of its ports are uplink ports to the edge server device.

In some implementations, within an LLDP message, the edge server device also informs the edge configuration device what the management VLAN is. In some implementations, the management VLAN is 1 (by default). In some implementations, if an IP address is not manually configured in the edge configuration device, and dynamic host configuration protocol (DHCP) is enabled in the edge configuration device, the edge configuration device then requests an IP address via DHCP. In some implementations, if an IP address is not manually configured in the edge configuration device, and a DHCP server is not reachable, the edge configuration device may still be configured via its console port.

Although there may be repeaters between the edge configuration device and the edge server device, LLDP messages transmitted by the edge configuration device are received by the edge server device, and LLDP messages transmitted by the edge server device and received by the edge configuration device. That is, in various implementations, the edge configuration device and the edge server device rely on LLDP messages, and not on physical link-up/link-down events, to determine the edge configuration device/edge server device connection.

In some implementations, LLDP messages include type length value (TLV) fields. In some implementations, there may be 2 separate TLVs. One TLV, which may be referred to as a fabric attach element TLV, indicated a device type (e.g., edge server device, edge configuration device, etc.) when a device is powered on. In various implementations, all devices send out LLDP messages when powered on to indicate their device type. Another TLV, which may be referred to as a fabric binding TLV includes requests for bindings in the edge configuration device, and approval indications or denial indications for such requests. As described in more detail below, edge configuration devices include requests for binding in LLDP messages to an edge server device. Also, edge server devices include approval indications and/or denial indications in LLDP messages to edge configuration devices.

Message Transmission in Networks

Figure 3:
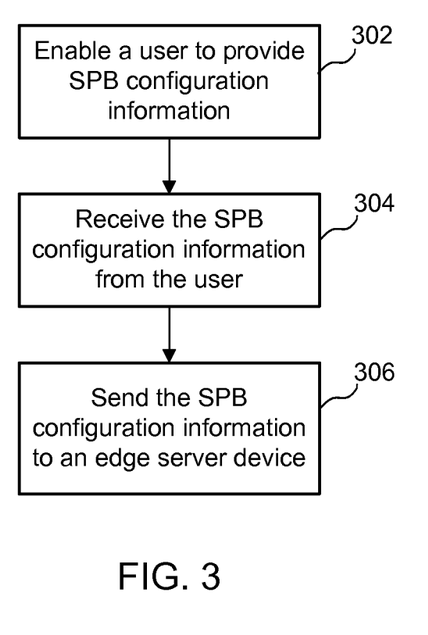
FIG. 3 illustrates an example simplified flow diagram for transmitting messages in networks, according to some implementations.

FIG. 3 illustrates an example simplified flow diagram for transmitting messages in networks, according to some implementations. Referring to both FIGS. 2 and 3, the method is initiated in block 302, where edge configuration device 204 of system 200 enables a user to provide shortest path bridging (SPB) configuration information. In various implementations, the user provides SPB configuration information at an edge configuration device 204, where the user can enter SPB configuration information using a CLI.

In block 304, edge configuration device 204 of system 200 receives the SPB configuration information from the user. In various implementations, the user performs the SPB configuration at edge configuration device 204 instead of edge server device 202.

In block 306, edge configuration device 204 of system 200 sends the SPB configuration information to edge server device 202. In various implementations, the SPB configuration information is sent in an LLDP message. In some implementations, the SPB configuration information is sent from edge configuration device 204 to edge server device 202 in an LLDP message. In various implementations, edge configuration device 204 and edge server device 202 exchange various types of information (e.g., VLAN-to-ISID mapping information, binding requests, approval indications, etc.) in LLDP messages.

In various implementations, the SPB configuration information includes virtual local area network-to-service identification (VLAN-to-ISID) mapping information. As described in more detail below in connection with FIG. 4, in various implementations, the SPB configuration information enables provider backbone bridge (MAC-in-MAC) encapsulation at edge server device 202. As described in more detail below in connection with FIG. 5, in various implementations, the SPB configuration information enables intermediate system-to-intermediate system (IS-IS) configuration at edge server device 202.

Enabling Configuration in Networks

Figure 4:
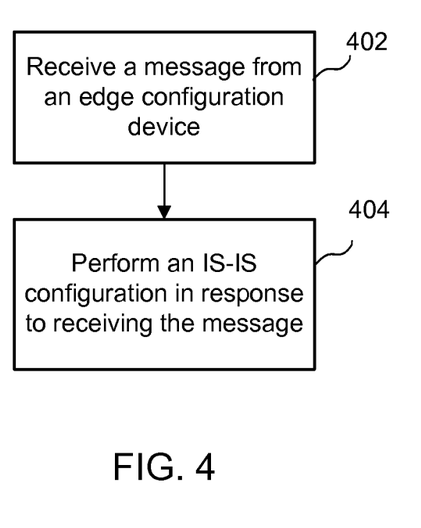
FIG. 4 illustrates an example simplified flow diagram for enabling configuration in networks, according to some implementations.

FIG. 4 illustrates an example simplified flow diagram for enabling configuration in networks, according to some implementations. Referring to both FIGS. 2 and 4, the method is initiated in block 402, edge server device 202 of system 200 receives a message from edge configuration device 204, where the message contains SPB configuration information. In various implementations, the message is an LLDP message.

In block 404, edge server device 202 of system 200 performs an intermediate system-to-intermediate system (IS-IS) configuration in response to receiving the message. In various implementations, IS-IS is a routing protocol designed to efficiently transmit information within a computer network. In various implementations, IS-IS involves the transmission of control packets, where the IS-IS broadcasts IS-IS Hello (IIH) packets to discover neighboring IS-IS routers, and to determine whether the neighbors are level 1 or level 2 routers. This is how IS-IS initializes and maintains adjacencies between neighboring routers.

In various implementations, after edge server device 202 receives the message, edge server device 202 performs the IS-IS configuration. In various implementations, the performing of the IS-IS configuration is initiated in response to receiving the message. In other words, the receipt of the message triggers the IS-IS configuration. In various implementations, the IS-IS configuration is enabled by the SPB configuration information provided by edge configuration device 204.

As described in more detail below, in various implementations, system 102 performs an SPB configuration in response to receiving the message, where the performing of the SPB configuration is enabled by the SPB configuration information provided by edge configuration device 204.

Enabling Encapsulation in Networks

Figure 5:
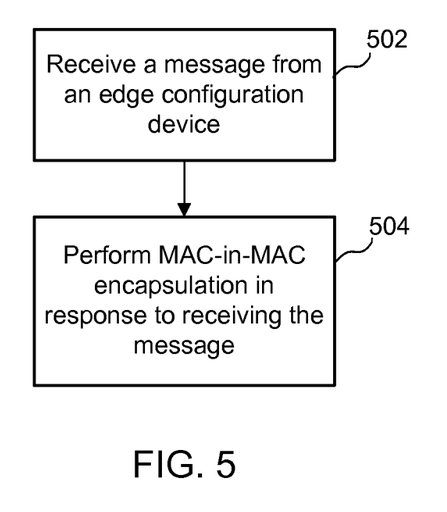
FIG. 5 illustrates an example simplified flow diagram for enabling encapsulation in networks, according to some implementations.

FIG. 5 illustrates an example simplified flow diagram for enabling encapsulation in networks, according to some implementations. Referring to both FIGS. 2 and 5, the method is initiated in block 502, where edge server device 202 of system 200 receives a message from edge configuration device 204, where the message contains SPB configuration information. In various implementations, the message is an LLDP message. As indicated above, in various implementations, the SPB configuration information is configured at edge configuration device 204. In various implementations, the SPB configuration information includes VLAN-to-ISID mapping information. Example implementations directed to SPB configuration at an edge configuration device is described in more detail below.

In block 504, edge server device 202 of system 200 performs MAC-in-MAC encapsulation in response to receiving the message. In various implementations, the MAC-in-MAC encapsulation is enabled by the SPB configuration information provided by the edge configuration device. In various implementations, the performing of the MAC-in-MAC encapsulation is triggered/initiated in response to receiving the message.

In various implementations, edge configuration device 204 includes requests for bindings along with the desired VLAN-to-ISID mapping information in the LLDP message. In various implementations, edge server device 202 approves or rejects the request and VLAN-to-ISID mapping information. If edge server device 202 approves, edge server device 202 transmits an approval indication back to edge configuration device 204. Once the VLAN-to-ISID mapping information is approved, the VLAN-to-ISID mapping information is activated at edge server device 202. In some implementations, the edge configuration device uplink port configuration occurs automatically upon VLAN/ISID binding approval. In some implementations, the edge configuration device access port configuration may occur manually.

In some implementations, if edge server device 202 denies/does not grant an approval of the request and VLAN-to-ISID mapping information, edge server device 202 provides a rejection indication.

SPB Configuration in an Edge Configuration Device

In various implementations, the desired VLAN-ISID mapping (also referred to as VLAN/ISID bindings) are configured in the edge configuration device. The edge configuration device sends the desired binding list to the edge server device (e.g., "Here is what I want to do"). The edge server device sends the approved binding list to the edge configuration device (e.g., "Here is what you are allowed to do"). The binding list is embedded in the LLDP messages between the edge server device and the edge configuration device. In some implementations, it may be desirable than the edge server device also sends a rejected binding list to the edge configuration device.

In various implementations, the edge configuration device and the edge server device may be connected via an uplink port, or an uplink multi-link trunking (MLT), in the edge configuration device. In some implementations, in a redundant configuration, the edge configuration device may connect via distributed multi-link trunking (DMLT) to a master/slave the edge server device/the edge server device' pair (where the edge server device/the edge server device' pair is connected via IST). In some implementations, because customer packets from the edge configuration device to the edge server device contain VLAN information, but do not contain source port information, the edge configuration device operates in CVLAN UNI mode. As such, in some implementations, the user needs to configure only a VLAN/ISID binding in the edge configuration device.

Considering an example implementation where the user wants to map VLAN 5 to ISID 500. In the edge configuration device, the user manually create VLAN 5, and manually specify which access ports are members of VLAN 5. Once the 5/500 binding is approved by the edge server device, VLAN 5 is automatically enabled on the edge configuration device's uplink ports, and VLAN 5 packets egress tagged on the edge configuration device's uplink ports. In some implementations, only the edge configuration device's uplink port configuration occurs automatically when a VLAN/ISID binding is approved by the edge server device. In the edge configuration device, VLAN creation and access port VLAN membership is still entered manually. When the edge server device receives a packet from the edge configuration device with VLAN 5, the edge server device MAC-in-MAC-encapsulates the packet with ISID 500.

SPB Configuration in an Edge Server Device

In some implementations, SPB configuration may occur directed at the edge server device, where the edge server device maps VLAN ID to an ISID. In switched UNI mode, the VLAN/ISID mapping is per port in the edge server device. For example, VID 5 may map to ISID 500 on port 1, while VID 5 may map to ISID 501 on port 2. In CVLAN UNI mode, the VLAN/ISID mapping is per the edge server device. For example, VID 6 may map to ISID 600 on all ports in the edge server device. The edge server device may operate in CVLAN UNI mode and switched UNI mode simultaneously.

There is much SPB configuration that occurs at the edge server device. In some implementations, VLAN/ISID binding may be configured at the edge server device, whether in customer VLAN-user network interface (CVLAN UNI) mode or in switched UNI mode. However, many users may prefer not to configure SPB on at the edge server device due to its complexities, and may prefer to configure SPB at the edge configuration device due to its simplicity.

In some implementations, only switched UNI bindings are be entered in the edge configuration device. CVLAN UNI bindings may be thought to be older technology. CVLAN UNI bindings may continue to be entered directly in the edge server device.

Considering an example implementation where the user uses the CLI in the edge configuration device to enter a VLAN/ISID binding, and the user want to map VLAN 5 to ISID 500. The edge configuration device maintains a list of locally generated VLAN/ISID bindings. In some implementations, if VLAN 5 already maps to a different ISID (such as ISID 600), the edge configuration device's CLI returns immediately with an error message, since a VLAN can map to only one ISID in the edge configuration device. If binding VLAN 5 to ISID 500 is acceptable from the edge configuration device's perspective. The edge configuration device adds the 5/500 binding to its desired binding list in the LLDP packet it transmits to the edge server device.

In switched UNI mode, the VLAN/ISID binding is per port in the edge server device, so there is no reason for the edge server device to deny any valid VLAN/ISID binding request from the edge configuration device. Thus, the edge server device accepts the 5/500 binding on its port that connects to the edge configuration device. The edge server device adds the 5/500 binding to its approved binding list in the LLDP packet it transmits to the edge configuration device.

The edge configuration device will determine when the 5/500 binding has been approved by the edge server device by checking for the 5/500 binding in the approved binding list in the edge server device's LLDP message.

As indicated above, the VLAN/ISID binding is not activated in the edge configuration device until the edge server device approves the VLAN/ISID binding (as indicated in the approved binding list in the edge server device's LLDP message to the edge configuration device).

The following describes example implementations, in which a user enters VLAN/ISID bindings via the CLI in edge configuration device 204.

FIG. 6 through FIG. 10 describe a scenario involving VLAN/ISID binding from a single edge configuration device (switched UNI mode). In various implementations, the label "E" in the figures represents VLAN/ISID bindings at an edge server device, and the label "$N_1$" in the figures represents VLAN/ISID bindings at an edge configuration device.

Figure 6:
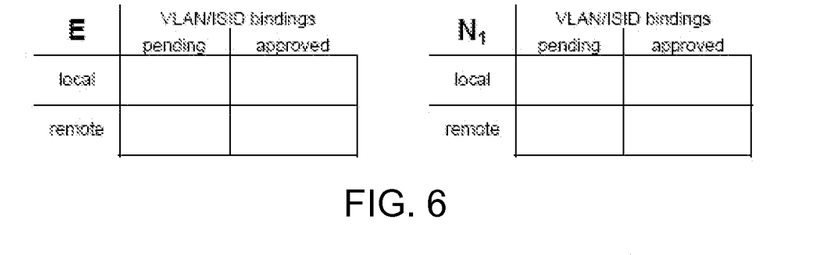
FIG. 6 illustrates example binding lists, according to some implementations.

FIG. 6 illustrates example binding lists, according to some implementations. As shown, in this particular scenario, both the edge server device and the edge configuration device initially have empty binding lists.

Figure 7:
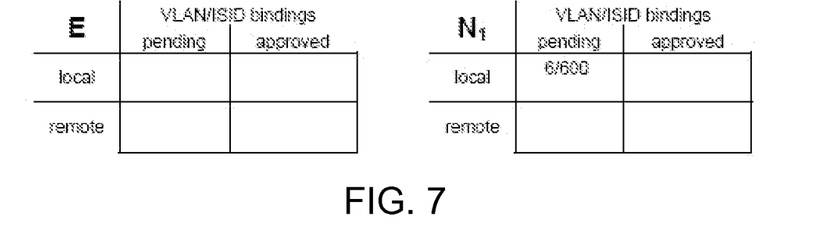
FIG. 7 illustrates example binding lists, according to some implementations.

FIG. 7 illustrates example binding lists, according to some implementations. As shown, the user first creates VLAN 6 in the edge configuration device, and places one or more access ports into VLAN 6. The user then enters a 6/600 binding via the CLI of the edge configuration device. The edge configuration device then places 6/600 in its local pending binding list.

Figure 8:
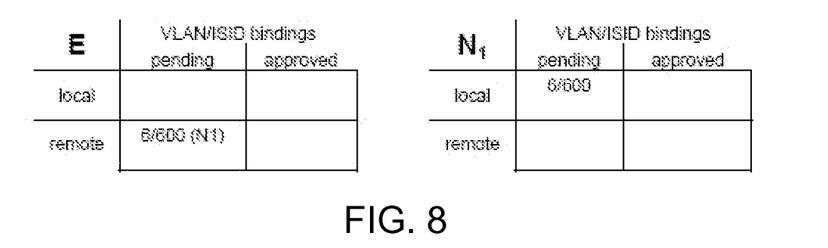
FIG. 8 illustrates example binding lists, according to some implementations.

FIG. 8 illustrates example binding lists, according to some implementations. As shown, the edge configuration device places 6/600 in its desired binding list in its LLDP message to the edge server device. The edge server device then receives the LLDP message from the edge configuration device, with the desired 6/600 binding. The edge server device then places 6/600 in its remote pending binding list.

Since 6/600 is a desired binding in switched UNI mode, the edge server device approves the 6/600 binding on its UNI port that connects to the edge configuration device. The following configuration updates occur automatically in the edge server device: VLAN 6 is created (if VLAN 6 does not already exist in the edge server device); the UNI port that connects to the edge configuration device is placed in VLAN 6; and VLAN 6 is mapped to ISID 600 on the UNI port that connects to the edge configuration device.

Figure 9:
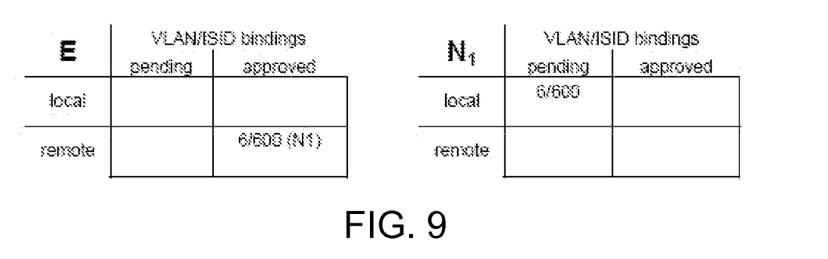
FIG. 9 illustrates example binding lists, according to some implementations.

FIG. 9 illustrates example binding lists, according to some implementations. As shown, the edge server device moves the 6/600 binding from its remote pending binding list to its remote approved binding list, and adds the 6/600 binding, or "6/600," in its approved binding list in its LLDP message to the edge configuration device.

Figure 10:
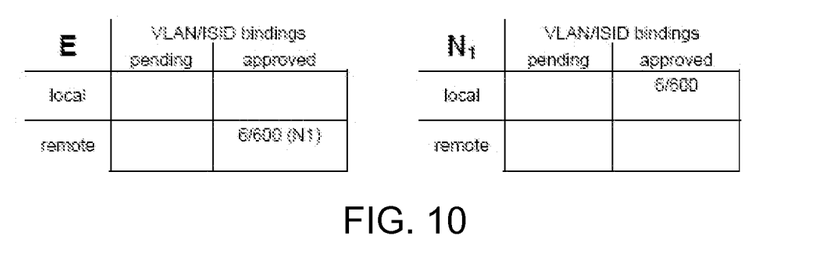
FIG. 10 illustrates example binding lists, according to some implementations.

FIG. 10 illustrates example binding lists, according to some implementations. As shown, the edge configuration device receives the LLDP message from the edge server device, and notices that 6/600 is in the approved binding list. The edge configuration device moves the 6/600 binding from its local pending binding list to its local approved binding list.

In various implementations, once 6/600 has moved to the edge configuration device's local approved binding list, the edge configuration device enables the 6/600 binding by automatically enabling VLAN 6 on its uplink ports and enabling tagged packet transmission on the uplink ports for VLAN 6

At this point, the edge server device begins to receive VLAN-6-tagged packets from the edge configuration device. The edge server device performs the MAC-in-MAC encapsulation, and maps VLAN 6 to ISID 600, but only on the UNI port that connects to the edge configuration device.

In various implementations, it is preferable that the edge server device maintains its VLAN/ISID bindings per edge configuration device. That is, a first edge configuration device does not know about the VLAN/ISID bindings entered via the CLI in a second edge configuration device, and the second edge configuration device does not know about the VLAN/ISID bindings entered via the CLI in the first edge configuration device N1. In some implementations, if the edge server device is able to generate only one global version of its LLDP message, then the edge configuration device identifying information would need to be added to the edge server device's approved VLAN/ISID binding list. If the edge server device can generate an individual LLDP message per port, the edge server device can send VLAN/ISID bindings specific to that port.

FIG. 11 through FIG. 14 describe a scenario involving mistyped VLAN/ISID binding from a second edge configuration device (switched UNI mode). This scenario continues from the scenario above in connection with FIGS. 6-10. In various implementations, the label "E" in the figures represents VLAN/ISID bindings at an edge server device, the label "$N_1$" in the figures represents VLAN/ISID bindings at a first edge configuration device, and the label "$N_2$" in the figures represents VLAN/ISID bindings at a second edge configuration device.

Figure 11:
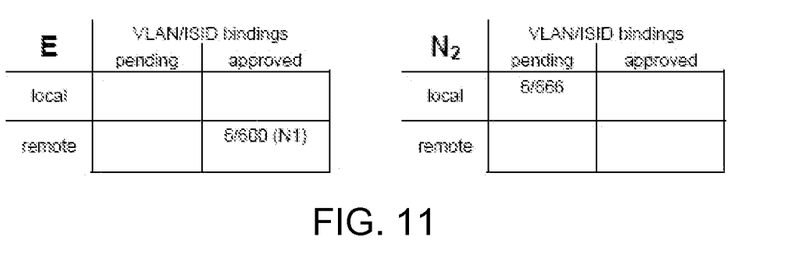
FIG. 11 illustrates example binding lists, according to some implementations.

FIG. 11 illustrates example binding lists, according to some implementations. As shown, the edge server device receives a mistyped VLAN/ISID binding from the second edge configuration device. In the example scenario, the user first creates VLAN 6 in second edge configuration device, and places one or more access ports into VLAN 6. Instead of entering the desired 6/600 binding, the user mistakenly enters a 6/666 binding via the CLI in the second edge configuration device. As in example 1, the second edge configuration device places 6/666 in its local pending binding list.

Figure 12:
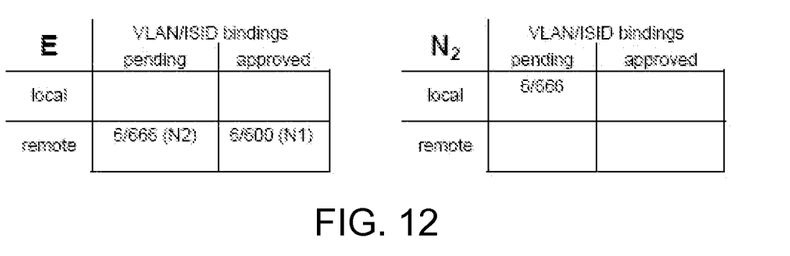
FIG. 12 illustrates example binding lists, according to some implementations.

FIG. 12 illustrates example binding lists, according to some implementations. As shown, the second edge configuration device places 6/666 in its desired binding list in its LLDP message to the edge server device.

The edge server device receives the LLDP message from the second edge configuration device, with the desired 6/666 binding. The edge server device places 6/666 in its remote pending binding list.

In various implementations, because 6/666 is a desired binding in switched UNI mode, the edge server device approves the 6/666 binding on its UNI port that connects to the second edge configuration device. The following commands may occur automatically in the edge server device: VLAN 6 is created (if VLAN 6 does not already exist in the edge server device); the UNI port that connects to the second edge configuration device is placed in VLAN 6; and VLAN 6 is mapped to ISID 666 on the UNI port that connects to the second edge configuration device.

Figure 13:
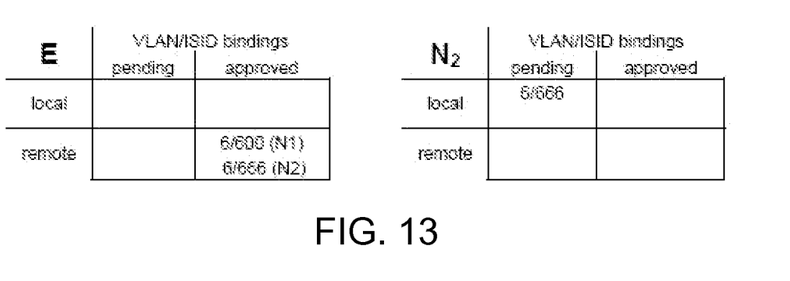
FIG. 13 illustrates example binding lists, according to some implementations.

FIG. 13 illustrates example binding lists, according to some implementations. As shown, the edge server device moves the 6/666 binding from its remote pending binding list to its remote approved binding list, and adds 6/666 in its approved binding list in its LLDP message to the second edge configuration device.

Figure 14:
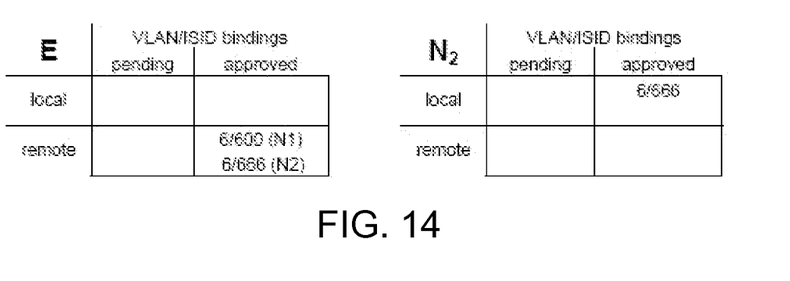
FIG. 14 illustrates example binding lists, according to some implementations.

FIG. 14 illustrates example binding lists, according to some implementations. As shown, the second edge configuration device receives the LLDP message from the edge server device, and notices that 6/666 is in the approved binding list. The second edge configuration device moves the 6/666 binding from its local pending binding list to its local approved binding list.

In various implementations, once 6/666 has moved to the second edge configuration device's local approved binding list, the second edge configuration device enables the 6/666 binding by automatically enabling VLAN 6 on its uplink ports, and enabling tagged packet transmission on the uplink ports for VLAN 6.

At this point, the edge server device begins to receive VLAN-6-tagged packets from the second edge configuration device. The edge server device performs the MAC-in-MAC encapsulation, and maps VLAN 6 to ISID 666, but only on the UNI port that connects to the second edge configuration device.

Accordingly, a mistyped VLAN/ISID binding request in the second edge configuration device will be accepted and enabled in the edge server device.

Storage of SPB Information in Configuration Files

In some implementations, if the VLAN/ISID bindings are added in the edge server device, the VLAN/ISID bindings may be considered local bindings, because these VLAN/ISID bindings were explicitly entered in the edge server device. In some implementations, these local VLAN/ISID bindings may be stored in the edge server device's configuration (config) file.

In some implementations, VLAN/ISID bindings are added in the edge configuration device. As such, the edge server device maintains a list of local bindings (entered in the edge server device) and a list of remote bindings (received from the edge configuration device). The local bindings are stored in the edge server device's configuration (config) file. In some implementations, the remote bindings are lost during an edge server device reset, and the remote bindings are re-established when the edge server device and the edge configuration device begin to communicate after a device reset.

From the edge configuration device's perspective, any VLAN/ISID bindings entered in the edge configuration device would be local bindings; these local bindings are stored in the edge configuration device's configuration file. It is probably useful if the edge configuration device stores an approved local binding list (e.g., bindings accepted by the edge server device) and a pending local binding list (i.e., bindings entered at the edge configuration device, but not yet accepted by the edge server device).

The following describes what happens when an edge server device or an edge configuration device resets (or connectivity to the box is lost, perhaps due to an unplugged cable).

Resetting of an Edge Server Device

As described herein, the edge server device's local bindings are retained in the edge server device's configuration. Any remote bindings received from the edge configuration device (or an end device) are lost. The edge server device places its local bindings in its outgoing LLDP messages. As binding requests are received from the edge configuration device's (or end devices), the edge server device validates the binding requests, and adds the approved bindings to the approved binding list in its outgoing LLDP messages.

The edge configuration device detects that the approved binding list from the edge server device has either disappeared (while the edge server device is resetting) or is shorter (due to the edge server device purging its remote bindings). The edge configuration device contracts its approved local binding list, and moves those bindings into its pending local binding list. In some implementations, these pending local bindings move to the approved local binding list only after the edge server device has approved the bindings. When a binding moves from the approved local binding list to the pending local binding list, the edge configuration device should remove the uplink ports from those VLANs.

Resetting of an Edge Configuration Device

As described herein, the edge configuration device's local bindings are retained in the edge configuration device's configuration. Any remote bindings received from end devices are lost. The edge configuration device's local bindings are placed in its pending local binding list, and the edge configuration device populates its LLDP message with the pending local bindings. The bindings move to the edge configuration device's approved local binding list after the edge server device has approved the bindings (by the edge server device adding the bindings to its LLDP message back to the edge configuration device).

SPB Droppings

In some implementations, any SPB artifacts that occur dynamically (in the edge configuration device or the edge server device) upon a VLAN/ISID binding approval, are automatically removed when the VLAN/ISID binding request is deleted. The goal is to not leave any SPB droppings in the edge configuration device or the edge server device.

As indicated herein, in some implementations, CVLAN UNI bindings are entered only in the edge server device. Thus, there are no changes in how CVLAN UNI bindings are handled. However, switched UNI bindings may be entered via the CLI in the edge configuration device or the edge server device.

Dynamic Actions in the Edge Configuration Device (when a Switched UNI Binding is Entered in the Edge Configuration Device)

In some implementations, when a VLAN/ISID binding request is entered in the edge configuration device and is approved by the edge server device, the following actions occur dynamically in the edge configuration device the VLAN is enabled on the edge configuration device's uplink ports; and packets in that VLAN are transmitted tagged on the edge configuration device's uplink ports In some implementations, when the VLAN/ISID binding request is deleted in the edge configuration device, the software in the edge configuration device will disable the VLAN on the configuration device's uplink ports, and transmit packets in that VLAN untagged on the edge configuration device's uplink ports.

A corner case may occur if the user also has manually enabled tagging for that VLAN on the edge configuration device's uplink ports, since the deletion of the VLAN/ISID binding will cause packets in that VLAN to be transmitted untagged on the edge configuration device's uplink ports.

Dynamic Actions in the Edge Server Device (when a Switched UNI Binding is Entered in the Edge Configuration Device)

In some implementations, when a VLAN/ISID binding request is entered in the edge configuration device and approved by the edge server device, the following actions occur dynamically in the edge server device: the VLAN is created (if the VLAN does not already exist in the edge server device); the UNI port that connects to the edge configuration device is placed in the VLAN; and the VLAN is mapped to the ISID on the UNI port that connects to the edge configuration device.

In some implementations, when the VLAN/ISID binding request is deleted in the edge configuration device, and this deletion is detected in the edge server device, the software in the edge server device will: leave the VLAN created; remove the UNI port that connects to the edge configuration device from the VLAN; and delete the VLAN/ISID binding on the UNI port that connects to the edge configuration device.

Thus, the VLAN created in the edge server device is an SPB dropping, when a VLAN/ISID binding request from the edge configuration device is deleted. There are too many intricacies to determine whether the VLAN should be deleted. For example, in the edge server device, the user may have initially manually created the VLAN, or manually placed additional ports in that VLAN, or the same switched UNI VLAN/ISID binding may have also been entered manually in the edge server device.

Dynamic Actions in the Edge Server Device (when a Switched UNI Binding is Entered in the Edge Server Device)

In some implementations, there are no changes in how a user performs SPB configuration directly in the edge server device. Thus, the user might continue to manually create the VLAN in the edge server device, and manually add the desired ports to the VLAN, when entering the VLAN/ISID binding in the edge server device.

When the VLAN/ISID binding request is deleted in the edge server device, there are no changes in how the edge server device reacts.

Figure 15:
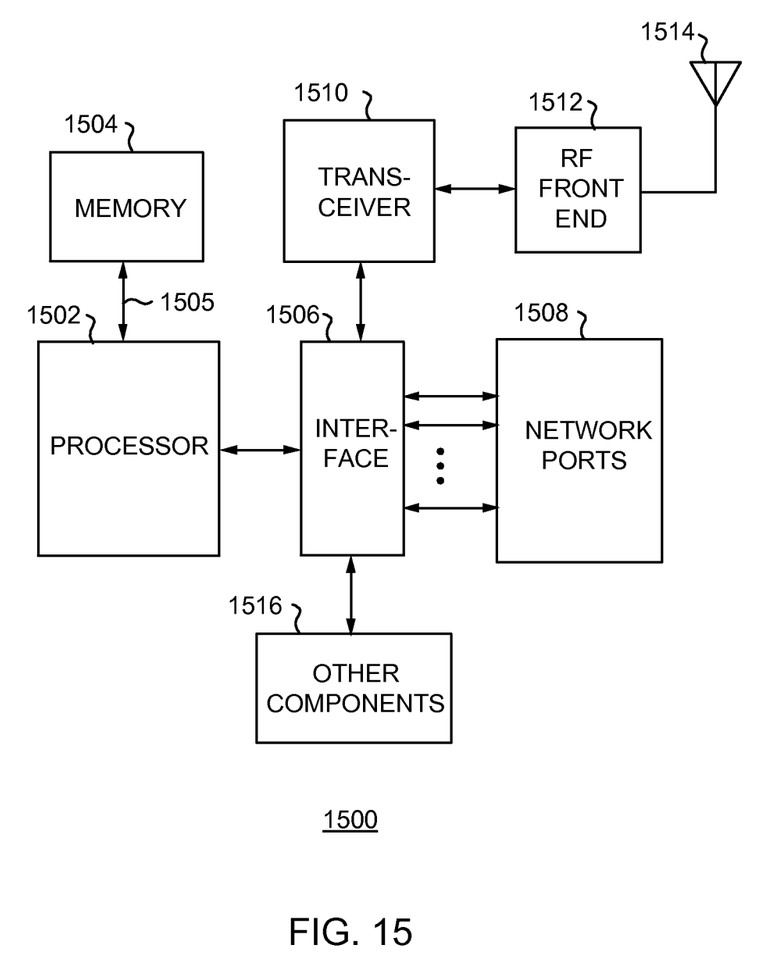
FIG. 15 illustrates a block diagram of an example device, which may be used to implement some implementations described herein.

FIG. 15 illustrates a block diagram of an example device, which may be used to implement some implementations described herein. Device 1500 can be, for example, a wireless controller 110 as shown in the example of FIG. 1, or other type of network device such as wireless access point 104, etc. In a basic configuration, device 1500 typically includes one or more processors 1502 and a system memory 1504. A memory bus 1505 can be used for communicating between processor 1502 and system memory 1504.

Depending on the desired configuration, processor 1502 can be of any type of processing circuitry including but not limited to one or more microprocessors, microcontrollers, digital signal processors (DSPs), application specific integrated circuits (ASICs), or any combination thereof. In some examples, processor 1502 can include one or more levels of caching, a processor core, and registers. An example processor core can include an arithmetic logic unit (ALU), a floating point unit (FPU), a digital signal processing core (DSP), or any combination thereof. A memory controller can also be used with processor 1502, or, in some implementations, a memory controller can be an internal part of processor 1502.

System memory 1504 can store data used in the operation of the device 1500. For example, device 1500 can be a wireless access controller and system memory 1504 can store an operating system for the controller, one or more applications for the controller, and program data. In some implementations, the memory 1504 can store software operative to perform network device functionality as well as read the instructions sent by an administrator or other user to the device and perform other functions as described above, including reading and executing commands and parameters, receiving information from associated wireless access points, and performing blocks of methods described herein using one or more processors. For example, access point profiles providing configurations for wireless access points, and/or software images and/or parameters for sending to be installed on access points, can be stored in memory 1504. Furthermore, a signal coverage map can be stored in memory 1504 representing the wireless coverage of associated wireless access points in the network, and/or all access points in the network. Alternatively, the software can be implemented as hardware or a combination of hardware and software. Memory 1504 can be implemented as one or more of various types, volatile and/or non-volatile, including RAM, ROM, EEPROM, flash memory or other memory technology, etc.

An interface 1506 can be used to interface the processor 1502 with other functional components of the device 1500. Such other components can include network ports 1508 of the device 1500 which are connected to other devices on the network to allow communication of data to and from other network devices. For example, Ethernet, Universal Serial Bus (USB), or other types of ports can allow wired network communication to the device 1500. A transceiver 1510 can be connected to interface 1506 to allow transmission and reception of wireless signals at the device 1500. For example, an RF front end 1512 and antenna 1514 can allow transmission and reception of wireless RF signals, as well as conversion between analog signals used in the wireless communication and digital signals used by the device 1500. Signals of other frequencies can be communicated in other implementations.

Additional components 1516 can also be connected to interface 1506. For example, storage devices can be connected to the interface 1506, such as CD-ROM, DVD, or other optical storage, magnetic tape storage, magnetic disk storage or other magnetic storage devices, solid state memory storage, or any other medium which can be used to store the desired information and which can be accessed by device 1500. Any such computer storage media (including memory 1504) can be part of or accessible by device 1500. Example computer storage media can include volatile and nonvolatile, removable and non-removable media implemented in any method or technology for storage of information, such as computer readable instructions, data structures, program modules, or other data.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

In general, it should be understood that the circuits described herein may be implemented in hardware using integrated circuit development technologies, or via some other methods, or the combination of hardware and software that could be ordered, parameterized, and connected in a software environment to implement different functions described herein. For example, the embodiments may be implemented using a general purpose or dedicated processor running a software application through volatile or non-volatile memory. Also, the hardware elements may communicate using electrical signals, with states of the electrical signals representing different data. It should be further understood that this and other arrangements described herein are for the purposes of example only. As such, those skilled in the art will appreciate that other arrangements and other elements (e.g., machines, interfaces, functions, orderings, and groupings of functions, etc.) may be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural terms and/or singular term herein, those having ordinary skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those of ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any suitable programming language may be used to implement the routines of particular embodiments including C, C++, Java, assembly language, etc. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method comprising:
   enabling a user to provide shortest path bridging (SPB) configuration information;
   receiving the SPB configuration information from the user; and
   sending the SPB configuration information to an edge server device, wherein the SPB configuration information is sent in a link layer discovery protocol (LLDP) message.

2. The method of claim 1, wherein the LLDP message includes one or more of a binding request and an approval indication.

3. The method of claim 1, wherein an edge configuration device receives the SPB configuration information from the user.

4. The method of claim 1, wherein an edge configuration device sends the SPB configuration information to the edge server device.

5. The method of claim 1, wherein an edge configuration device receives the SPB configuration information from the user, wherein the edge configuration device sends the SPB configuration information to the edge server device, and wherein the edge configuration device and the edge server device are separate devices.

6. The method of claim 1, wherein the SPB configuration information includes virtual local area network-to-service identification (VLAN-to-ISID) mapping information.

7. The method of claim 1, wherein the SPB configuration information enables provider backbone bridge (MAC-in-MAC) encapsulation at the edge server device.

8. The method of claim 1, wherein the SPB configuration information enables intermediate system-to-intermediate system (IS-IS) configuration at the edge server device.

9. A computer program product comprising a non-transitory computer-readable medium including program instructions to be implemented by a device connected to a communication network, the program instructions for:
   enabling a user to provide shortest path bridging (SPB) configuration information;
   receiving the SPB configuration information from the user; and
   sending the SPB configuration information to an edge server device, wherein the SPB configuration information is sent in a link layer discovery protocol (LLDP) message.

10. The computer program product of claim 9, wherein the LLDP message includes one or more of a binding request and an approval indication.

11. The computer program product of claim 9, wherein an edge configuration device receives the SPB configuration information from the user.

12. The computer program product of claim 9, wherein an edge configuration device sends the SPB configuration information to the edge server device.

13. The computer program product of claim 9, wherein an edge configuration device receives the SPB configuration information from the user, wherein the edge configuration device sends the SPB configuration information to the edge server device, and wherein the edge configuration device and the edge server device are separate devices.

14. The computer program product of claim 9, wherein the SPB configuration information includes virtual local area network-to-service identification (VLAN-to-ISID) mapping information.

15. The computer program product of claim 9, wherein the SPB configuration information enables provider backbone bridge (MAC-in-MAC) encapsulation at the edge server device.

16. The computer program product of claim 9, wherein the SPB configuration information enables intermediate system-to-intermediate system (IS-IS) configuration at the edge server device.

17. A device comprising:
   a memory; and
   at least one processor operative to access the memory and perform operations comprising:
   enabling a user to provide shortest path bridging (SPB) configuration information;
   receiving the SPB configuration information from the user; and
   sending the SPB configuration information to an edge server device, wherein the SPB configuration information is sent in a link layer discovery protocol (LLDP) message.

18. The device of claim 17, wherein the LLDP message includes one or more of a binding request and an approval indication.

19. The device of claim 17, wherein an edge configuration device receives the SPB configuration information from the user.

20. The device of claim 17, wherein an edge configuration device sends the SPB configuration information to the edge server device.

* * * * *